United States Patent
Constantin et al.

(10) Patent No.: US 6,198,725 B1
(45) Date of Patent: Mar. 6, 2001

(54) NETWORK ELEMENT DELAY ALLOCATION FOR EFFICIENT USE OF NETWORK RESOURCES

(75) Inventors: Robert Constantin, Cambridge, MA (US); David E. Hammond, Bedford, NH (US); David N. Peck, Northbridge; Salma Abu-Ayyash, Cambridge, both of MA (US); Stephen R. Veit, Chesterfield, MO (US); Thomas A. Manning, Northboro, MA (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/270,574

(22) Filed: Mar. 16, 1999

(51) Int. Cl.$^7$ .............................. H04L 12/28; H04L 12/56
(52) U.S. Cl. ........................ 370/235; 370/351; 370/395; 370/418
(58) Field of Search ................................... 370/235, 238, 370/231, 253, 229, 230, 232, 351, 395, 412, 417, 418

(56) References Cited

U.S. PATENT DOCUMENTS

| | | | |
|---|---|---|---|
| 5,483,523 | * | 1/1996 | Nederlof .............................. 370/58.3 |
| 5,689,499 | * | 11/1997 | Hullett et al. ........................ 370/235 |
| 5,796,719 | * | 8/1998 | Peris et al. ........................... 370/231 |
| 5,933,414 | * | 8/1999 | Georgiadis et al. ................. 370/238 |
| 5,933,425 | * | 8/1999 | Iwata .................................... 370/351 |
| 5,953,337 | * | 9/1999 | Almay ................................. 370/395 |

OTHER PUBLICATIONS

Affidavit of Thomas A. Manning executed on Aug. 16, 1999 with Exhibits A–H.
Affidavit of Mark Bernasconi executed on Dec. 13, 1999 with Exhibits A–E.
Affidavit of Jerome Neff executed on Dec. 16, 1999 with Exhibit A.

* cited by examiner

Primary Examiner—Huy D. Vu
Assistant Examiner—M. Phan
(74) Attorney, Agent, or Firm—Weingarten, Schurgin, Gagnebin & Hayes LLP (57) ABSTRACT

A system for allocating resources at network elements along a path through a communications network. Resources are allocated at a network element along the path in response to a connection request message. The delay budget is the minimum of a calculated cell transfer delay and a calculated cell delay variation. The calculated cell transfer delay is determined by finding a difference between a target end to end cell delay and an accumulated cell delay, and then dividing that difference by a number of network elements remaining in the path between the network element and the end of the path. To determine the calculated cell delay variation, the network element first finds a difference between the Max CDV QoS parameter and the sum of the accumulated cell delay variation and the switching delay for the network element. The calculated cell delay variation is then equal to that difference divided by the number of network elements remaining in the path between the network element and the end of the path. The target end to end cell delay is for example determined by the first network element in the path as equal to the Max CTD QoS parameter minus the end to end link propagation delay for the path and the link propagation delay for the incoming link to the first network element over which the message was received. The first network element generates and forwards a modified connection request message including the determined target end to end cell delay value, as well as a designated transit list indicating each network element in the prospective path, and including a current network element pointer.

13 Claims, 3 Drawing Sheets

CALL SETUP MESSAGE, *80*

NETWORK ELEMENT DELAY ALLOCATION FOR EFFICIENT USE OF NETWORK RESOURCES

CROSS REFERENCE TO RELATED APPLCIATIONS

Not Applicable

STATEMENT REGARDING FEDERALLY SPONSORED RESEARCH OR DEVELOPMENT

Not Applicable

BACKGROUND OF THE INVENTION

The disclosed invention relates generally to resource allocation in network elements of a communications network, and more specifically to a system for allocating resources to virtual connections in a network switch.

Communications networks interconnect end stations through paths including multiple devices or systems referred to as network elements. Network elements may include devices known as switches, bridges and routers. It is sometimes necessary to ensure a maximum end to end delay and a maximum end to end delay variation for data units transferred along a path between two end stations. For example, when a user at a first end station (end station A) requests that a virtual connection be established with a second end station (end station B), the request may include certain Quality of Service (QoS) parameters specifying performance levels that must be met by any resulting connection. In an Asynchronous Transfer Mode (ATM) environment, such QoS parameters include "Maximum Cell Transfer Delay" (Max CTD), and "Maximum Cell Delay Variation" (Max CDV). The Max CTD parameter defines an upper limit for total delay permitted for cells transmitted over the requested connection. The Max CDV parameter defines the maximum permitted variation between cell transfer delays over the requested connection.

In the above example, end station A will attempt to establish a path to end station B on which sufficient resources are available in each network element along the path to support the QoS parameters associated with a given request. If such resources are available, then each network element along the path reserves resources for the connection, and the connection is established.

The various kinds of delay that may be experienced by a data unit may be thought of as falling into three categories: 1) link propagation delay (LPD), 2) switching delay (SD), and 3) queuing delay (QD). The end to end LPD for a given path is the sum of the delays encountered by a data unit on the links for a given path. The end to end LPD does not include the time a data unit may be delayed within a network element. Switching delay is the time required to pass a data unit between an input port and an output port within a switch, assuming no queuing delays due to traffic congestion. Accordingly, switching delay is a function of the inherent speed of a particular switch. Queuing delay is the delay resulting from a data unit being stored in an input or output queue within a network element, and is dependant on the congestion being experienced by that network element at a specific point in time. Thus, actual delay and delay variation reflect both resource capacity and utilization at each network element that is traversed by a data unit within a given path through a network.

In existing systems, when a network element receives a request to establish a connection, the network element will reserve resources to be used to support the connection if the connection request is granted. However, existing systems test potential paths using a mechanism which passes only the maximum permitted delay, maximum permitted delay variation, and accumulated delay to each of the network elements in the path as the path is being tested. While these parameters are sufficient to determine whether a path should be eliminated from consideration due to insufficient resources, such systems fail to provide adequate information for each network element in the path to reserve resources accurately in order to meet the specific needs of a given connection. As a result, resources may be under or over allocated to a connection because the network elements cannot accurately determine the amount of resources that should be allocated.

For the reasons stated above, it would be desirable to have a system for allocating resources to a virtual connection along a path through a communications network which more accurately provides information to network elements along the path, such that resources are not over or under allocated. The system should permit network elements along the path to satisfy a connection request by accurately allocating resources in response to characteristics of the path being tested. The system should further be convenient to implement and compatible with existing systems.

SUMMARY OF THE INVENTION

In accordance with the present invention, a system for allocating resources at network elements along a path through a communications network is disclosed which addresses the aforementioned shortcomings of previous systems. The disclosed system is applicable to various types of network elements including switches, routers, bridges, and other devices. In the disclosed system, resources are allocated at a network element along a path between a first end station and a second end station in response to a message that is received by that network element. The message includes information elements indicating target end to end cell delay, accumulated cell delay variation, and accumulated cell transfer delay, as well as the Max CDV and Max CTD QoS parameters from a connection request associated with the received message. The network element determines a delay budget by determining a minimum of a calculated cell transfer delay and a calculated cell delay variation. The calculated cell transfer delay value is determined by finding a difference between the target end to end cell delay and an accumulated cell delay, and then dividing that difference by a number of network elements remaining in the path between the network element and the end of the path. To determine the calculated cell delay variation, the network element first finds a difference between the Max CDV QoS parameter and the sum of the accumulated cell delay variation and the switching delay for the network element. The calculated cell delay variation is then equal to that difference divided by the number of network elements remaining in the path between the network element and the end of the path.

The target end to end cell delay is for example determined by the first network element in the path. The target end to end cell delay may be determined as equal to the Max CTD QoS parameter minus the end to end link propagation delay for the path and the link propagation delay for the incoming link to the first network element over which the message was received. The first network element then generates and forwards a modified connection request message including the determined target end to end cell delay value.

The number of network elements remaining in the path may be determined in response to the contents of the connection request message. In one embodiment the message includes a list of network elements remaining in the path. Alternatively, the network element receiving the message could determine the number of network elements remaining in the path based on topology information within that network element.

Following calculation of the delay budget, the network element allocates resources for the associated virtual connection sufficient to process received cells on that connection without exceeding the delay budget. Such resources potentially include buffers to store cells associated with that connection, as well as switch fabric bandwidth to forward such cells from an incoming port to an outgoing port.

DETAILED DESCRIPTION OF THE INVENTION

Figure 1:
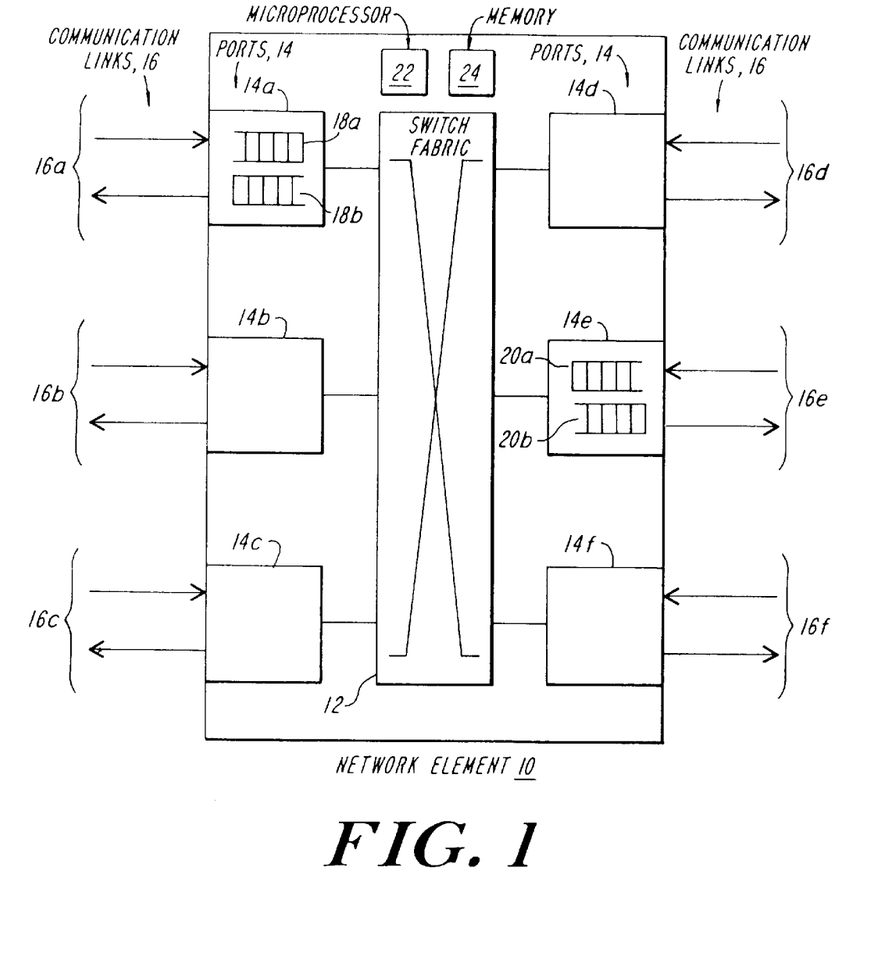
FIG. 1 is a block diagram showing an example of a network element.

FIG. 1 is a block diagram of a network element 10, shown for purposes of example as a switch having a switch fabric 12, and a number of ports 14 coupled with communication links 16. The network element 10 is shown further including a microprocessor 22 and memory 24. Each of the ports 14 is associated with some number of buffers, shown for purposes of illustration by receive buffers 18a and transmit buffers 18B associated with port 14a, and by receive buffers 20a and transmit buffers 20b associated with port 14e.

During operation of the elements shown in FIG. 1, data units are received on various ones of the communication links 16. Such data units are for example cells as conveyed through devices which implement the Asynchronous Transfer Mode (ATM) protocol. As each data unit is received, it must be stored within one or more receive buffers, such as receive buffers 18a or 20a. Receive and transmit buffers are examples of resources within the network element 10 which may be reserved on a per virtual connection basis. This is referred to as "allocating" the resource to the connection. Once a resource is allocated to a connection, that resource will only be used by the network element to process data units associated with that connection. For example, if one of the receive buffers 18a is allocated to a connection A, then that receive buffer will only be used to store data units received over connection A.

Further during operation of the elements shown in FIG. 1, data units received by the network element 10 are forwarded from the port at which they are received, referred to as the "ingress" port, to a port from which they will be transmitted from the network element 10, which is referred to as the "egress" port. Similarly, the particular one of the communication links 16 over which the data is transmitted from the network element is referred to as the "egress" link for that data unit, and the link on which it was received is the "ingress" link. In an example embodiment, each virtual connection passing through the network element 10 is associated with one ingress link and one egress link.

The switch fabric 12 has an inherent capacity, or "bandwidth", which may be used to forward data units between ingress and egress ports. This switch fabric bandwidth is another example of a resource which is allocated on a per connection basis.

In sum, there are certain resources within the network element 10 which are used to process data units and which are allocated in varying amounts to particular virtual connections. The amount of these resources which are allocated to a specific connection will determine the performance characteristics, including throughput and delay, of the network element 10 with regard to processing data units associated with that connection.

Figure 2:
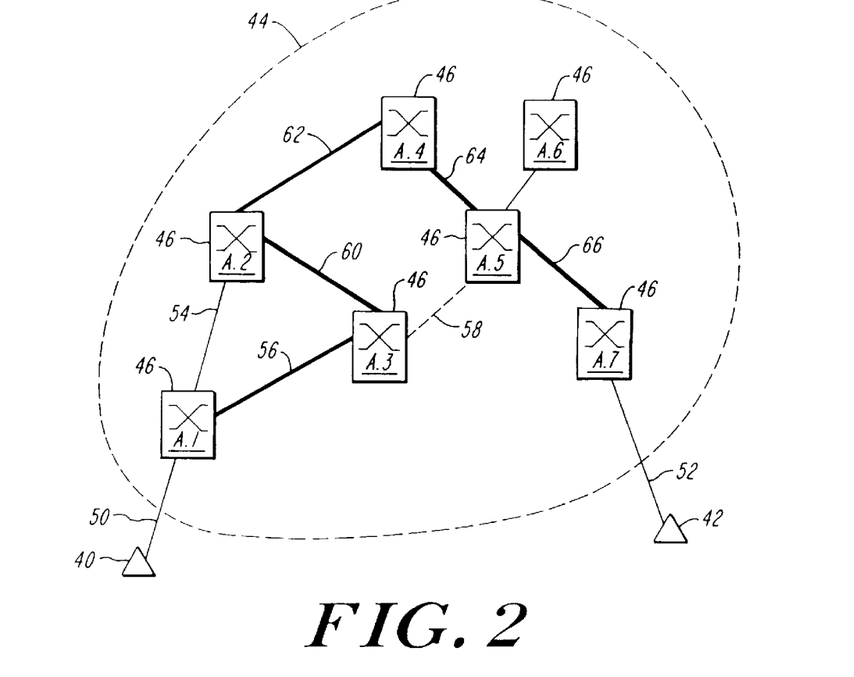
FIG. 2 shows a virtual connection over a path including a number of network elements in a communications network.

FIG. 2 shows a communications network 44 to which are attached end stations 40 and 42. End station 40 is connected to the network 44 by communication link 50, while end station 42 is connected to the network 44 by link 52. The communications network 44 is shown including a number of network elements 46, shown for purposes of example as switching devices or "switches". The network elements 46 are interconnected by a number of communication links numbered 54, 56, 58, 60, 62, 64 and 66.

During operation of elements shown in FIG. 2, a user at end station 40 requests a virtual connection with end station 42. The user also specifies various quality of service parameters in the request, which must be satisfied by the connection granted for this request. These parameters include Max CTD and Max CDV.

In response to this request by the user on end station 40, end station 40 sends a connection request message to network element A.1. Network element A.1 examines the contents of the connection request message, and determines whether it has sufficient available resources to support the QoS parameters of the requested connection. The network element A.1 will reserve resources necessary to support the request connection if possible as described below. Finally, network element A.1 modifies the connection request message, also as described below, and forwards the modified message onto a next link indicated by a designated transfer list (DTL) provided by the routing services functionality within the network element A.1. For purposes of example, the DTL provided by the routing services would not include link 58, due to a determination that link 58 was experiencing congestion. In the example of FIG. 2, network element A.1 forwards the modified connection request message onto link 56, which is connected with network element A.3.

Network element A.3 then receives the modified connection request message. Network element A.3 determines a next link for requested connection responsive to the contents of the connection request message. Network element A.3 determines whether it has sufficient resources to support the connection. If it does not, it sends a message back to network element A.1 indicating that the requested connection could not be established. Network element A.1 would then attempt to form the connection using an alternative path. Otherwise network element A.3 would reserve resources to be used to support the requested connection, modify the connection request message, and forward the modified connection request message onto a selected next communication link, for example communication link 60.

The process as described for network element A.3 is then repeated for network elements A.2, A.4, A.5 and A.7, as indicated by the darkened lines on communication links 60, 62, 64, and 66. The resulting path for the successfully established virtual connection between end station 40 and end station 42 thus includes network elements A.1, A.3, A.2, A.4, A.5, and A.7.

Figure 3:
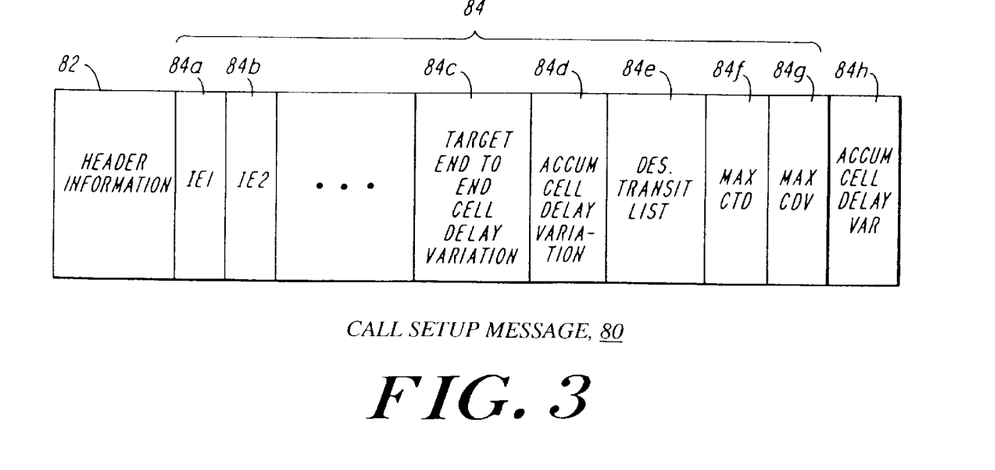
FIG. 3 is a block diagram showing information elements in a call setup message.

FIG. 3 shows an example format for a connection request message. FIG. 3 shows a call setup message 80, compatible with the Asynchronous Transfer Mode (ATM) communications protocol, including header information 82, and a number of information elements 84, including information elements 84a, 84b, 84c, 84d, 84e, 8f, and 84g. Information element 84c includes a target end to end cell delay value. The target end to end cell delay is a value calculated at the first network element along a prospective path for a requested virtual connection. Information element 84d includes an accumulated cell delay. The accumulated cell delay is a value that is incremented by each network element in a prospective path for a requested virtual connection. The amount a network element increments the accumulated cell delay information element of a connection request message is a function of the amount of resources the network element has reserved for the requested connection.

Information element 84e also includes a designated transit list (DTL) that contains a list of network elements in the prospective path for the requested virtual connection. In an illustrative embodiment, the designated transit list further includes a current network element pointer, indicating the current network element that is processing the connection request message in the prospective path. In the illustrative embodiment, the current network element pointer enables a receiver of the connection request message to determine the number of network elements remaining in the prospective path.

Information element 84f includes the Max CTD QoS parameter from the connection request associated with the call setup message 80. Information element 84g includes the Max CDV QoS parameter also from the connection request associated with the call setup message 80. Information element 84h includes an accumulated cell delay variation. The accumulated cell delay variation is a value that is incremented by each network element in a prospective path for a requested virtual connection. The amount a network element increments the accumulated cell delay variation information element of a connection request message is a function of the amount of resources the network element has reserved for the requested connection.

In the case where the path being established is part of a point to multipoint connection, the connection request message would alternatively consist of an add-party message, having information elements including the information described in connection with the information elements 84c through 84h of FIG. 3.

Figure 4:
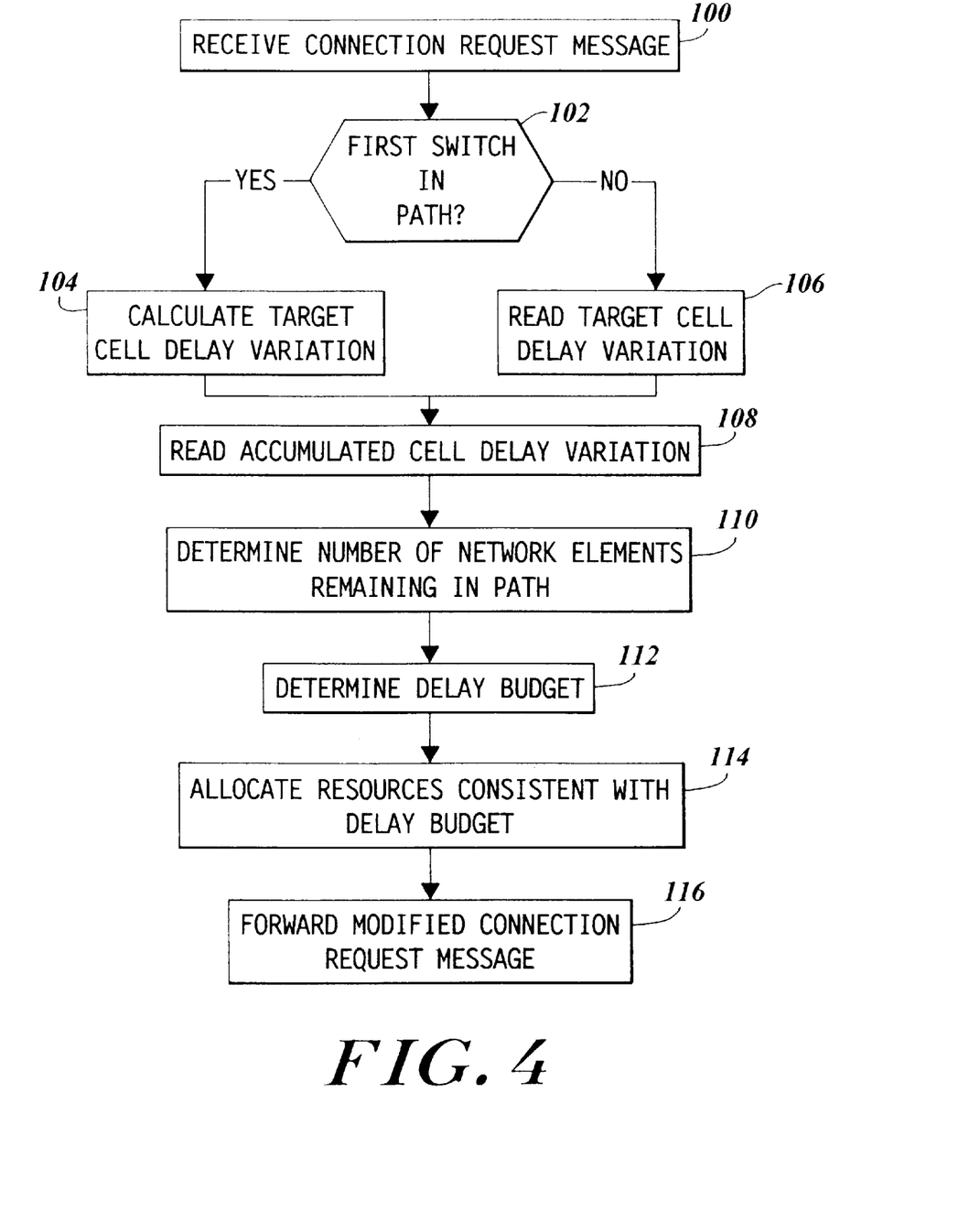
FIG. 4 is a flow chart showing steps performed to determine a delay budget in a network element.

FIG. 4 shows steps performed to allocate resources within a network element in accord with the present invention. The steps of FIG. 4 are for example performed by a computer program executing on one or more processors within a network element, such as processor 22 in network element 10 of FIG. 1.

At step 100, the network element receives a connection request message. At step 102, the network element determines from the contents of the connection request message whether it is the first network element in the prospective path for the requested connection. This determination may for example be made by examining a contents of an accumulated cell delay, accumulated cell delay variation, and/or a target end to end cell delay information element. When the connection request message is received at the first network element in the prospective path, these information elements have a value of 0. If the receiving network element is the first network element in the prospective path, then step 102 is followed by step 104. Otherwise, step 102 is followed by step 106.

At step 104, the first network element in the path calculates a target end to end cell delay. The target end to end cell delay is calculated as the Max CTD QoS parameter in the received message minus an end to end link propagation delay for the path and the link propagation delay for the incoming link to the first network element over which the message was received. The end to end link propagation delay is calculated by first examining the designated transit list to determine the network elements in the path. This list will reflect all communications links in the path except the path on which the connection request was received (the ingress link). The network element then refers to an internal data structure which reflects the known topology of the communications network. This data structure includes an advertised link propagation delay for each known link. The end to end link propagation delay is the sum of these per link propagation delays.

The ingress link propagation delay is the propagation delay of the communications link on which the connection request message was received. The network element may for example, determine the link propagation delay of any given communications link from values input by a system administrator, or by using one of a number of conventional protocols for measuring the propagation delay of a link to which it is connected. Once a network element obtains the link propagation delay of a link to which it is connected, it may advertise that link propagation delay by sending advertisement messages to other network elements in the communications network.

In the alternative, for network elements other than the first, at step 106 the target cell delay is read from an information element in the connection request message.

At step 108 the network element reads the accumulated cell delay, accumulated cell delay variation, and Max CDV values from information elements in the connection request message. At step 110 the network element determines the number of network elements remaining in the prospective path by examining the designated transit list and associated current pointer in the connection request message. As the designated transit list includes all network elements in the prospective path as well as a pointer to the current network element, at step 110 the network element counts the number of network elements remaining in the path as indicated by the designated transit list and the current network element pointer.

At step 112, the network element determines a delay budget equal to the minimum of a calculated cell transfer delay and a calculated cell delay variation. The calculated cell transfer delay value is determined by finding a difference between the target end to end cell delay and the accumulated cell delay in the connection request message, and then dividing that difference by the number of network elements remaining in the path as determined at step 110. To determine the calculated cell delay variation, the network element first finds a difference between the Max CDV QoS parameter and the sum of the accumulated cell delay variation and a switching delay for the network element. The calculated cell delay variation is then equal to that difference divided by the number of network elements remaining in the path between the network element and the end of the path as determined at step 110.

At step 114, the network element allocates resources for the virtual connection associated with the connection request message received at step 100. The amount of resources allocated at step 114 is at least sufficient to process data units on the connection without exceeding the delay budget calculated at step 112. The amount of resources necessary to stay within the delay budget may be calculated using conventional techniques. If insufficient resources are available in the network element to process data units within the delay budget, the network element sends a message back to the network element from which it received the connection request message. That network element then will attempt to form the requested connection using a prospective path which does not include the network element having insufficient resources. Under such conditions, step 116 would not be performed.

If sufficient resources were available to support the calculated delay budget, then at step 116 the network element modifies the connection request message, and forwards it to the next network element in the designated transit list. The network element modifies the connection request message by updating the current pointer to indicate the next network element in the path, and by adding amounts to the accumulated cell delay and accumulated cell delay variation information elements that reflect the resources allocated for the connection associated with the connection request message. If the network element was the first element in prospective path, then the network element also writes the value of the target end to end cell delay calculated at step 104 into the connection request message before forwarding it on. The first network element in the path further writes the designated transit list received from the routing services of that network element into the modified connection request message.

Those skilled in the art should readily appreciate that the programs defining the functions of the present invention can be delivered to a computer in many forms; including , but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media such as computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Specifically, while the preferred embodiments are disclosed with reference to the ATM communication protocol, the present invention is applicable to other network environments. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for allocating resources at network elements along a path through a communications network, said path between a first end station and a second end station, comprising:

receiving at least one message in at least one of said network elements along said path, said message including a first information element indicating a target end to end delay; and determining a delay budget, responsive to said received message, said delay budget based on a minimum of a calculated transfer delay and a calculated delay variation, wherein said calculated transfer delay is a difference between said target end to end delay and an accumulated delay divided by a number of network elements remaining in said path.

2. The method of claim 1, further comprising calculating said calculated delay variation by:

determining a difference between a maximum delay variation for a virtual connection associated with said received message and the sum of an accumulated delay variation and the switching delay for the network element; and dividing said difference by said number of network elements remaining in the path between the network element and the end of the path.

3. The method of claim 2 further comprising determining, at a first network element in said path, said target end to end delay by:

determining a sum of an end to end propagation delay for said path and a link propagation delay for the incoming link of said first network element on which said message was received; and subtracting said sum from a maximum transfer delay associated with said virtual connection.

4. The method of claim 3, wherein said target end to end delay variation is determined at said first element in response to said at least one message.

5. The method of claim 4, wherein said at least one message is a call setup message generated in response to a request by a user at said first end station.

6. The method of claim 4, wherein said request is for a point to point connection.

7. The method of claim 4, wherein said at least one message is an add-party message, and said request is for a point to multipoint connection.

8. The method of claim 1, wherein said number of network elements remaining in said path between said at least one of said network elements and said second end station is determined in response to a content of said at least one message.

9. The method of claim 1, wherein said at least one message includes a list of network elements remaining in said path between said at least one of said network elements and said second end station.

10. The method of claim 1, further comprising allocating resources to a virtual connection sufficient to process at least one received data unit without exceeding said delay budget.

11. The method of claim 10, wherein said resources include buffers to store said at least one received data unit.

12. The method of claim 11, wherein said resources include switch fabric bandwidth to forward said at least one received data unit from an incoming port to an outgoing port.

13. The method of claim 11, wherein said said number of network elements in said path is determined responsive to a designated transit list and a current network element pointer in said at least one message.

\* \* \* \* \*

UNITED STATES PATENT AND TRADEMARK OFFICE
CERTIFICATE OF CORRECTION

PATENT NO.    : 6,198,725 B1
DATED         : March 6, 2001
INVENTOR(S)   : Robert Constantin et al.

It is certified that error appears in the above-identified patent and that said Letters Patent is hereby corrected as shown below:

<u>Column 8,</u>
Line 1, insert the following paragraph, -- determining a designated transit list, wherein said designated transit list indicates those network elements located along said path;--;
Line 4, delete "and";
Line 5, insert the following paragraph,
-- determining, responsive at least in part to said designated transit list, a number of network elements remaining in said path; --;
Line 10, "by a number" should read -- by said number --;
Line 11, "path." should read --path; and
      in the event that insufficient resources are available to support a virtual connection associated with said received message without exceeding said delay budget, generating a message indicating that said virtual connection could not be established. --;
Line 15, "for a virtual" should read -- for said virtual --;
Lines 22-31, claim 3 should read as follows:
--3. A method for allocating resources at network elements along a path through a communications network, said path between a first end station and a second end station, comprising:
   receiving at least one message in at least one of said network elements along said path, said message including a first information element indicating a target end to end delay; and
   determining a delay budget, responsive to said received message, said delay budget based on a minimum of a calculated transfer delay and a calculated delay variation, wherein said calculated transfer delay is a difference between said target end to end delay and an accumulated delay divided by a number of network elements remaining in said path;
    wherein said calculated delay variation is calculated by
      determining a difference between a maximum delay variation for a virtual connection associated with said received message and the sum of an accumulated delay variation and the switching delay for the network element, and
      dividing said difference by said number of network elements remaining in the path between the network element and the end of the path; and

UNITED STATES PATENT AND TRADEMARK OFFICE
CERTIFICATE OF CORRECTION

PATENT NO. : 6,198,725 B1
DATED : March 6, 2001
INVENTOR(S) : Robert Constantin et al.

It is certified that error appears in the above-identified patent and that said Letters Patent is hereby corrected as shown below:

wherein said target end to end delay is determined, at a first network element in said path, by
 determining a sum of an end to end propagation delay for said path and a link propagation delay for the incoming link of said first network element on which said message was received, and
 subtracting said sum from a maximum transfer delay associated with said virtual connection.--;
Lines 42-46, claim 8 should read as follows:
-- 8. The method of claim 1, further comprising:
storing said designated transit list in said at least one message; and
 wherein said number of network elements remaining in said path between said at least one of said network elements and said second end station is determined in response to said at least one message. --;
Lines 47-50, claim 9 should read as follows:
-- 9. The method of claim 8, further comprising:
modifying said designated transit list stored in said at least one message to include a list of network elements remaining in said path between said at least one of said network elements and said second end station. --;
Lines 51-53, claim 10 should read as follows:
-- 10. The method of claim 1, further comprising:
in the event that sufficient resources are available to support a virtual connection associated with said received message without exceeding said delay budget, allocating said resources to said virtual connection. --; and

UNITED STATES PATENT AND TRADEMARK OFFICE
CERTIFICATE OF CORRECTION

PATENT NO.   : 6,198,725 B1
DATED        : March 6, 2001
INVENTOR(S)  : Robert Constantin et al.

It is certified that error appears in the above-identified patent and that said Letters Patent is hereby corrected as shown below:

<u>Column 8 cont'd.</u>
Lines 60-63, claim 13 should read as follows:
-- 13. The method of claim 1 further comprising:
  wherein said number of network elements remaining in said path
is determined responsive to said designated transit list and a current
network element pointer in said at least one message. --.

Signed and Sealed this

Twenty-fifth Day of June, 2002

Attest:

Attesting Officer

JAMES E. ROGAN
*Director of the United States Patent and Trademark Office*